US012677095B2

(12) United States Patent
Verschueren et al.

(10) Patent No.: US 12,677,095 B2
(45) Date of Patent: Jul. 7, 2026

(54) SYNCHRONIZATION BETWEEN BLUETOOTH AUDIO TRANSMITTERS FOR COLLISION AVOIDANCE

(71) Applicant: NXP B.V., Eindhoven (NL)

(72) Inventors: Pieter Verschueren, Langdorp (BE); Sammy Geeraerts, Nieuwrode (BE)

(73) Assignee: NXP B.V., Eindhoven (NL)

( * ) Notice: Subject to any disclaimer, the term of this patent is extended or adjusted under 35 U.S.C. 154(b) by 209 days.

(21) Appl. No.: 18/393,423

(22) Filed: Dec. 21, 2023

(65) Prior Publication Data

US 2025/0211906 A1 Jun. 26, 2025

(51) Int. Cl.
*H04R 5/04* (2006.01)
*H04W 56/00* (2009.01)

(52) U.S. Cl.
CPC ............ *H04R 5/04* (2013.01); *H04W 56/002* (2013.01); *H04R 2420/07* (2013.01)

(58) Field of Classification Search
CPC .... H04R 2420/07; H04R 1/406; H04R 3/005; H04R 1/1041; H04R 25/554; H04R 5/04; H04B 1/38; H04M 1/72502; H04M 2207/18; H04M 3/56; H04M 3/568; H04L 2027/0026; H04L 27/0014; H04L 27/2655; H04L 5/0012; H04L 5/14; H04W 4/80; H04W 56/001; H04W 56/002
USPC .......................................... 381/74, 1–3, 312
See application file for complete search history.

(56) References Cited

U.S. PATENT DOCUMENTS

| 2017/0127145 A1* | 5/2017 | Rajapakse ............ H04R 29/006 |
| 2022/0116711 A1 | 4/2022 | Haggai et al. |
| 2024/0223972 A1* | 7/2024 | Davis ................... H04R 25/554 |
| 2024/0267081 A1* | 8/2024 | D'Ambrosio ....... G06F 13/4247 |

FOREIGN PATENT DOCUMENTS

EP          3879848 A1     9/2021

OTHER PUBLICATIONS

Lee, J., "Broadcast Audio Transmission for Bluetooth LE on an Interfered ISM Band", IEEE Internet of Things Journal, vol. 6, No. 4, Aug. 2019, pp. 6140-6150.

* cited by examiner

*Primary Examiner* — Lun-See Lao

(57) ABSTRACT

A method and apparatus are described for synchronization between Bluetooth audio transmitters. In one example, an audio source includes a synchronization bus. A first audio transmitter is coupled to the audio source and to the synchronization bus. The first audio transmitter is configured to assess available radio channels, select a set of radio channels, send transmit commands to a second audio transmitter through the synchronization bus, and to transmit a first set of audio streams from the audio source to a first set of one or more audio sinks using the selected radio channels. The second audio transmitter is configured to receive the transmit commands from the first audio transmitter through the synchronization bus and to transmit a second set of audio streams from the audio source to a second set of one or more audio sinks in accordance with the transmit commands.

20 Claims, 7 Drawing Sheets

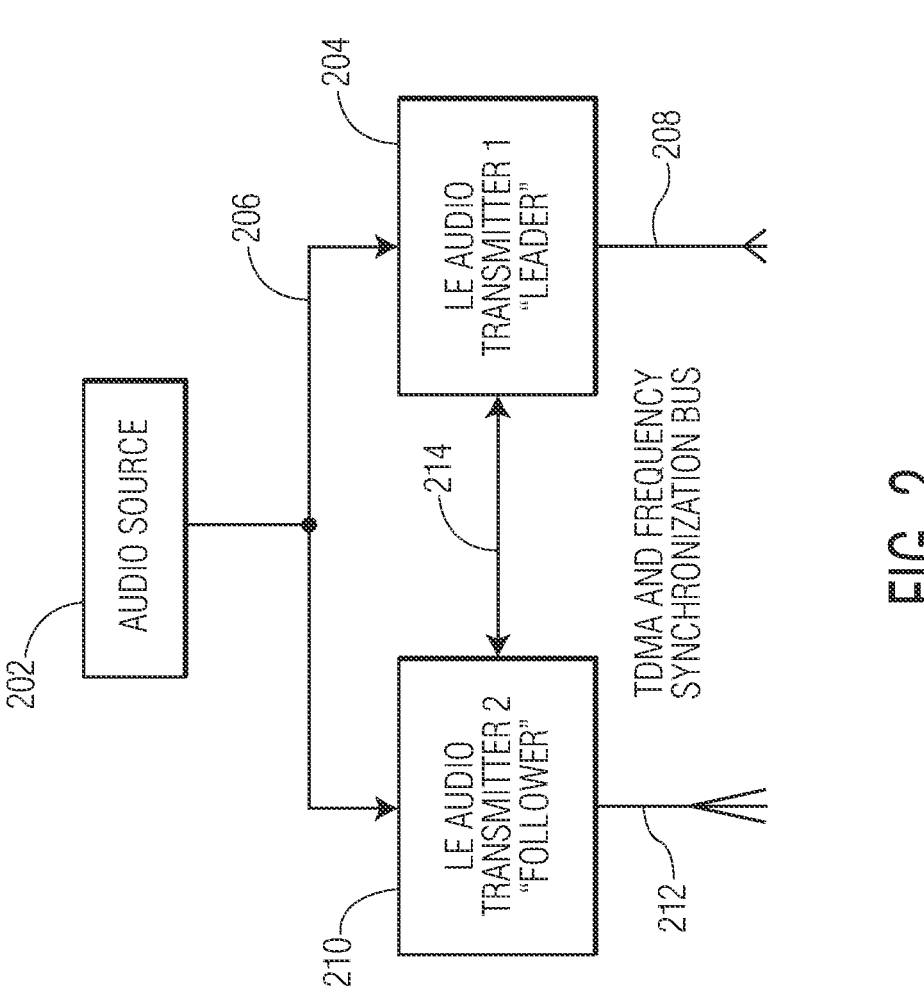
FIG. 2

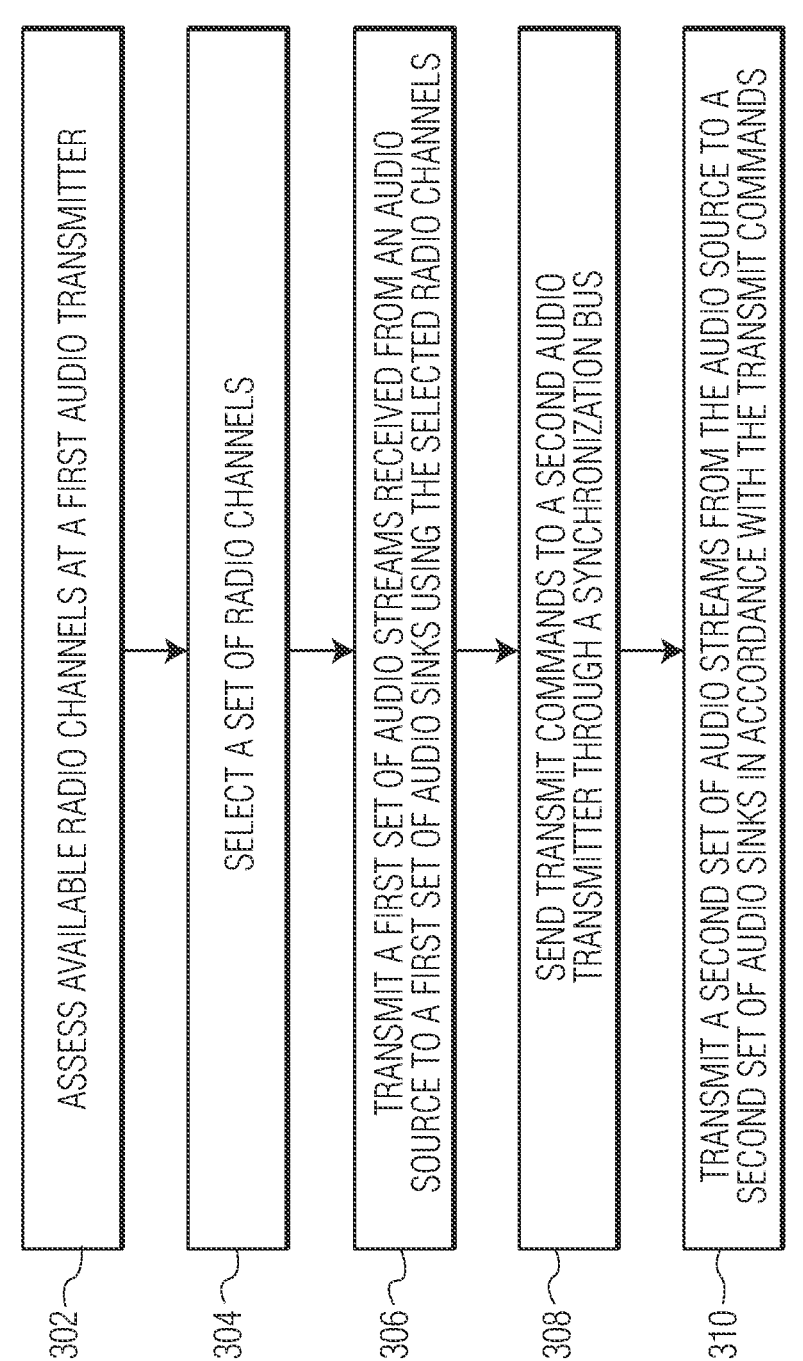

302 — ASSESS AVAILABLE RADIO CHANNELS AT A FIRST AUDIO TRANSMITTER

304 — SELECT A SET OF RADIO CHANNELS

306 — TRANSMIT A FIRST SET OF AUDIO STREAMS RECEIVED FROM AN AUDIO SOURCE TO A FIRST SET OF AUDIO SINKS USING THE SELECTED RADIO CHANNELS

308 — SEND TRANSMIT COMMANDS TO A SECOND AUDIO TRANSMITTER THROUGH A SYNCHRONIZATION BUS

310 — TRANSMIT A SECOND SET OF AUDIO STREAMS FROM THE AUDIO SOURCE TO A SECOND SET OF AUDIO SINKS IN ACCORDANCE WITH THE TRANSMIT COMMANDS

FIG. 3

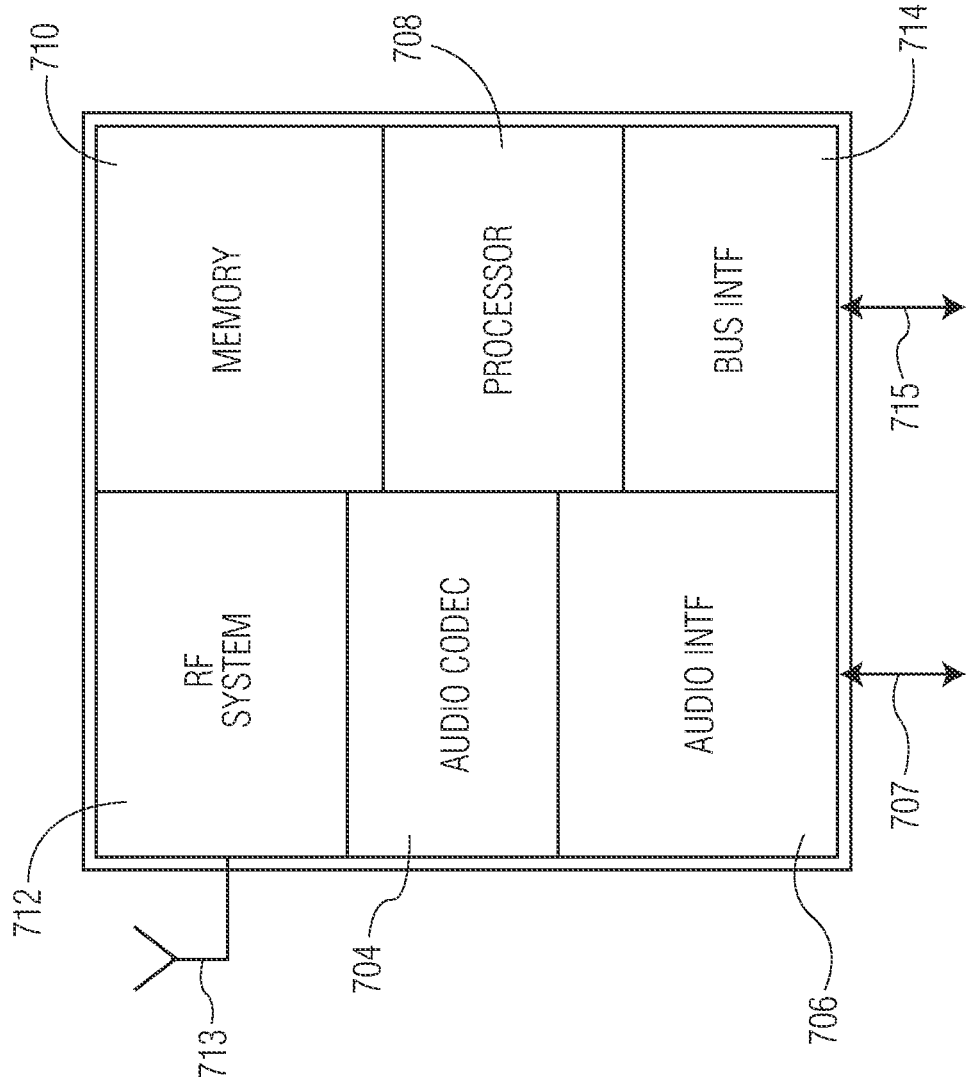
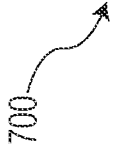
FIG. 7

SYNCHRONIZATION BETWEEN BLUETOOTH AUDIO TRANSMITTERS FOR COLLISION AVOIDANCE

BACKGROUND

Bluetooth® radio communications from the Bluetooth Standard Interest Group is a standard for wireless communications between electronic devices and has always included audio profiles for microphones and speakers. While stereo music transmission has been in place for many years and is now referred to as Classic Audio, the LE Audio (Low Energy Audio) standard Bluetooth extension expands Bluetooth audio transmission enabling many new use cases. Multi-Stream Audio allows the transmission of multiple independent synchronized audio streams between an audio source device and one or more audio sinks. The LC3 (Low Complexity Communications Codec) Codec is added for multiple audio streams to provide higher quality audio at lower transmission data rates.

One such new use case is for home theater using a soundbar or receiver as a central audio controller that connects to multiple speakers or audio sinks where each speaker receives a unique, synchronized, simultaneous audio stream. The same approach may be used to provide spatial audio in conference room and virtual reality settings. Another new use case is conference room or spatial audio environments in which multiple microphones connect to a central controller to provide spatial information to a remote location participating in a conference. Another such use case is in providing multiple broadcasts simultaneously to different listeners in the same space, such as announcements in different languages at airports and train stations. Auracast™ is being developed as a set of technologies for multiple simultaneous audio broadcasts.

In the example of home theater, systems have developed from 5.1 channels (5 audio channels and a subwoofer) to 6.1, to 7.1, to 7.2 (7 audio channels and 2 subwoofer channels) to 9.2, to Dolby® Atmos and DTS®:X with still more channels. While e.g., stereo provides complete independent audio signals or tracks for each channel, Dolby Atmos, among others, provides a single audio signal with metadata to characterize the intended sound. The audio decoder may then generate as many different audio signals or tracks as is suitable for the installed system. Many configurations exist for different price points, different uses, and different suppliers.

SUMMARY

A method and apparatus are described for synchronization between Bluetooth audio transmitters for collision avoidance. In one example, an audio device includes an audio source, a synchronization bus, a first audio transmitter coupled to the audio source and to the synchronization bus, the first audio transmitter to assess available radio channels, to select a set of radio channels, to send transmit commands to a second audio transmitter through the synchronization bus, and to transmit a first set of audio streams from the audio source to a first set of one or more audio sinks using the selected radio channels, and the second audio transmitter coupled to the audio source and to the synchronization bus configured to receive the transmit commands from the first audio transmitter through the synchronization bus and to transmit a second set of audio streams from the audio source to a second set of one or more audio sinks in accordance with the transmit commands.

In some embodiments, the second audio transmitter is configured to assess available radio channels, to generate link quality information based on the assessing, and to send the link quality information to the first audio transmitter through the synchronization bus, wherein the first audio transmitter is configured to select a set of radio channels based, at least in part, on the link quality information.

In some embodiments, the first audio transmitter is configured to select a set of radio channels by selecting a first set of radio channels for transmitting the first set of audio streams, and selecting a second set of radio channels for transmitting the second set of audio streams, and wherein the transmit commands include an identification of the second set of radio channels.

In some embodiments, the first set of radio channels does not include any radio channels of the second set of radio channels and the second set of radio channels does not include any radio channels of the first set of radio channels.

In some embodiments, the first set of radio channels are represented as a first channel map and the second set of radio channels are represented as a second channel map, and wherein the first audio transmitter is configured to send the second channel map in the transmit commands.

In some embodiments, the audio streams comprise repeating sequences of subevents, the audio streams hop frequencies at subevents in accordance with a hopping sequence, the second audio transmitter is configured to synchronize transmitting the second set of audio streams with the first audio transmitter using the synchronization bus, and the second audio transmitter is configured to transmit the second set of audio streams synchronized with the first audio transmitter with the subevents offset by an integer number of subevents with respect to the subevents of the first audio transmitter.

In some embodiments, the second audio transmitter is configured to transmit the second set of audio streams with an offset of one subevent of the sequence of subevents.

In some embodiments, the first audio transmitter is configured to send a channel map of the selected set of radio channels to the second audio transmitter through the synchronization bus and wherein the first audio transmitter is configured to transmit the first set of audio streams based on the channel map and the second audio transmitter transmits the second set of audio streams based on the channel map.

In some embodiments, the audio streams comprise repeating sequences of subevents, the audio streams hop frequencies at subevents in accordance with a hopping sequence, the second audio transmitter is configured to synchronize transmitting the second set of audio streams with the first audio transmitter using the synchronization bus, and the second audio transmitter is configured to transmit the second set of audio streams synchronized with the first audio transmitter with the hopping sequence and an offset to the hopping sequence.

In some embodiments, the offset comprises a channel index offset.

In some embodiments, the offset comprises a frequency offset.

In some embodiments, the secondary audio transmitter is configured to receive input parameters for the hopping sequence from the first audio transmitter through the synchronization bus, and the second audio transmitter is configured to generate the hopping sequence for transmitting the second set of audio streams seeded by the input parameters.

In an embodiment, a method includes assessing available radio channels at a first audio transmitter, selecting a set of radio channels, transmitting a first set of audio streams received from an audio source to a first set of one or more audio sinks using the selected radio channels, sending transmit commands to a second audio transmitter through a synchronization bus, and transmitting a second set of audio streams from the audio source to a second set of one or more audio sinks in accordance with the transmit commands.

Some embodiments include assessing available radio channels at the second audio transmitter, generating link quality information based on the assessing, and sending the link quality information to the first audio transmitter through the synchronization bus, wherein selecting a set of radio channels comprises selecting a set of radio channels based, at least in part, on the link quality information.

In some embodiments, the audio streams comprise repeating sequences of subevents, wherein the audio streams hop frequencies at subevents in accordance with a hopping sequence, the method further including the second audio transmitter synchronizing transmitting the second set of audio streams with the first audio transmitter using the synchronization bus and offsetting the transmitting the second set of audio streams by an integer number of subevents with respect to the subevents of the first audio transmitter.

In some embodiments, the offset is one subevent of the sequence of subevents.

Some embodiments include sending a channel map of the selected set of radio channels to the second audio transmitter through the synchronization bus, wherein transmitting the first set of audio streams comprises transmitting the first set of audio streams based on the channel map and wherein transmitting the second set of audio streams comprises transmitting the second set of audio streams based on the channel map.

In some embodiments, the audio streams comprise repeating sequences of subevents, wherein the audio streams hop frequencies at subevents in accordance with a hopping sequence, the method including synchronizing transmitting the second set of audio streams with the first audio transmitter using the synchronization bus, and wherein transmitting the second set of audio streams comprises transmitting the second set of audio streams synchronized with the first audio transmitter with the hopping sequence and an offset of one hop to the hopping sequence.

In some embodiments, the offset comprises a channel index offset.

In embodiments an apparatus includes means for assessing available radio channels at a first audio transmitter, means for selecting a set of radio channels, means for transmitting a first set of audio streams received from an audio source to a first set of one or more audio sinks using the selected radio channels, means for sending transmit commands to a second audio transmitter through a synchronization bus, and means for transmitting a second set of audio streams from the audio source to a second set of one or more audio sinks in accordance with the transmit commands.

BRIEF DESCRIPTION OF THE DRAWINGS

FIG. 2 is a block diagram of a transmitter portion of a soundbar suitable for use with the home entertainment system of FIG. 1 according to embodiments herein.

FIG. 3 is a process flow diagram of operations performed by the audio device according to embodiments herein.

4

Figure 5:
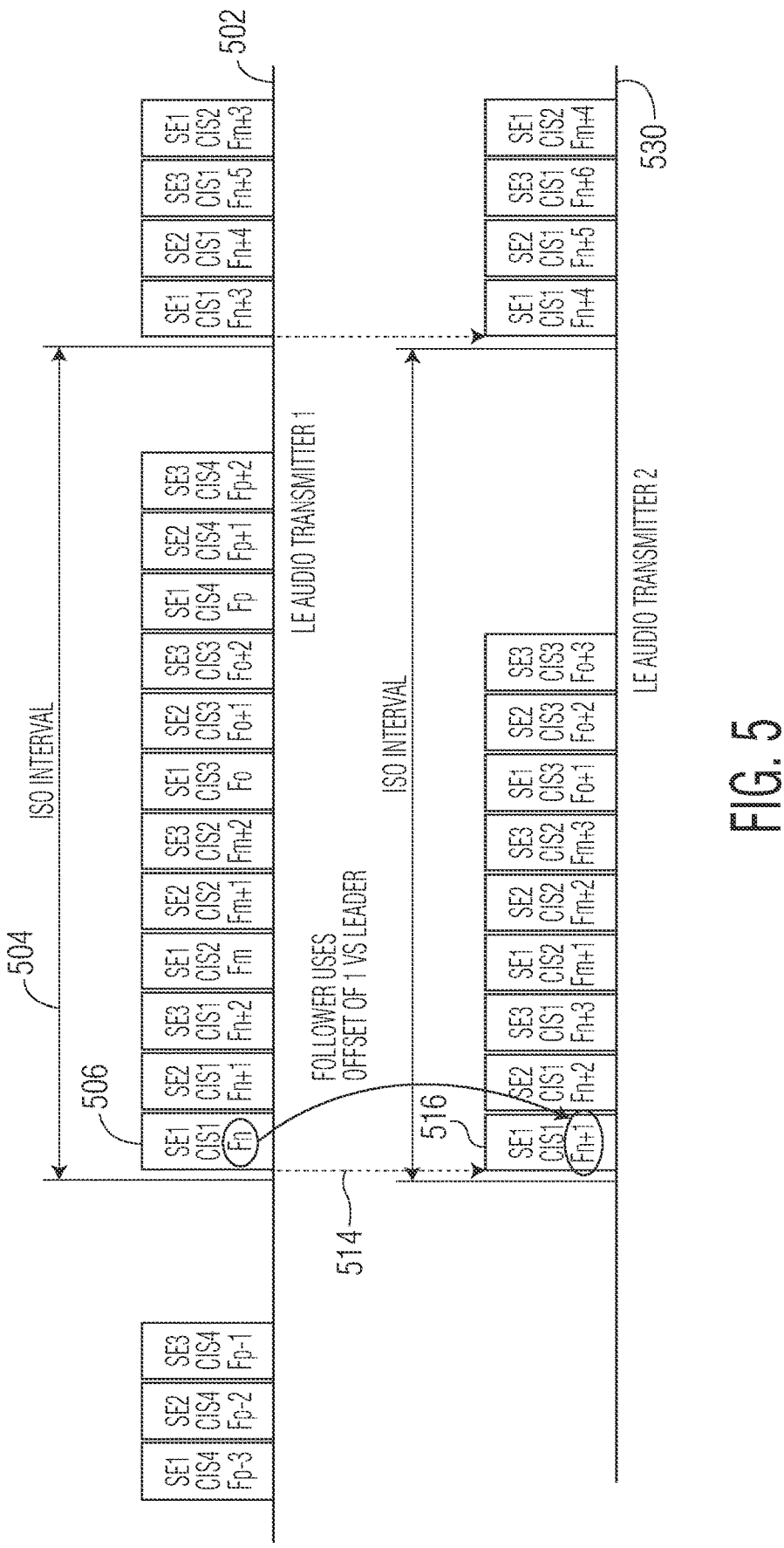

FIG. 5 is second signal diagram of a first audio stream along a first timeline and a second audio stream along a second timeline according to embodiments herein.

Figure 6:

FIG. 6 is third signal diagram of a first audio stream along a first timeline and a second audio stream along a second timeline according to embodiments herein.

FIG. 7 is a block diagram of an audio transmitter suitable for use as a leader or follower according to embodiments herein.

DETAILED DESCRIPTION

Embodiments are described in the context of a multiple speaker audio system, e.g., a home theater installation, however, the principles described herein may be applied outside of a home theater and for multiple microphones in addition to, or instead of, speakers. Examples are presented in the context of 7 speakers, e.g., a 6.1 or 7.0 sound system, however, other numbers of speakers may be used instead or in addition.

Figure 1:
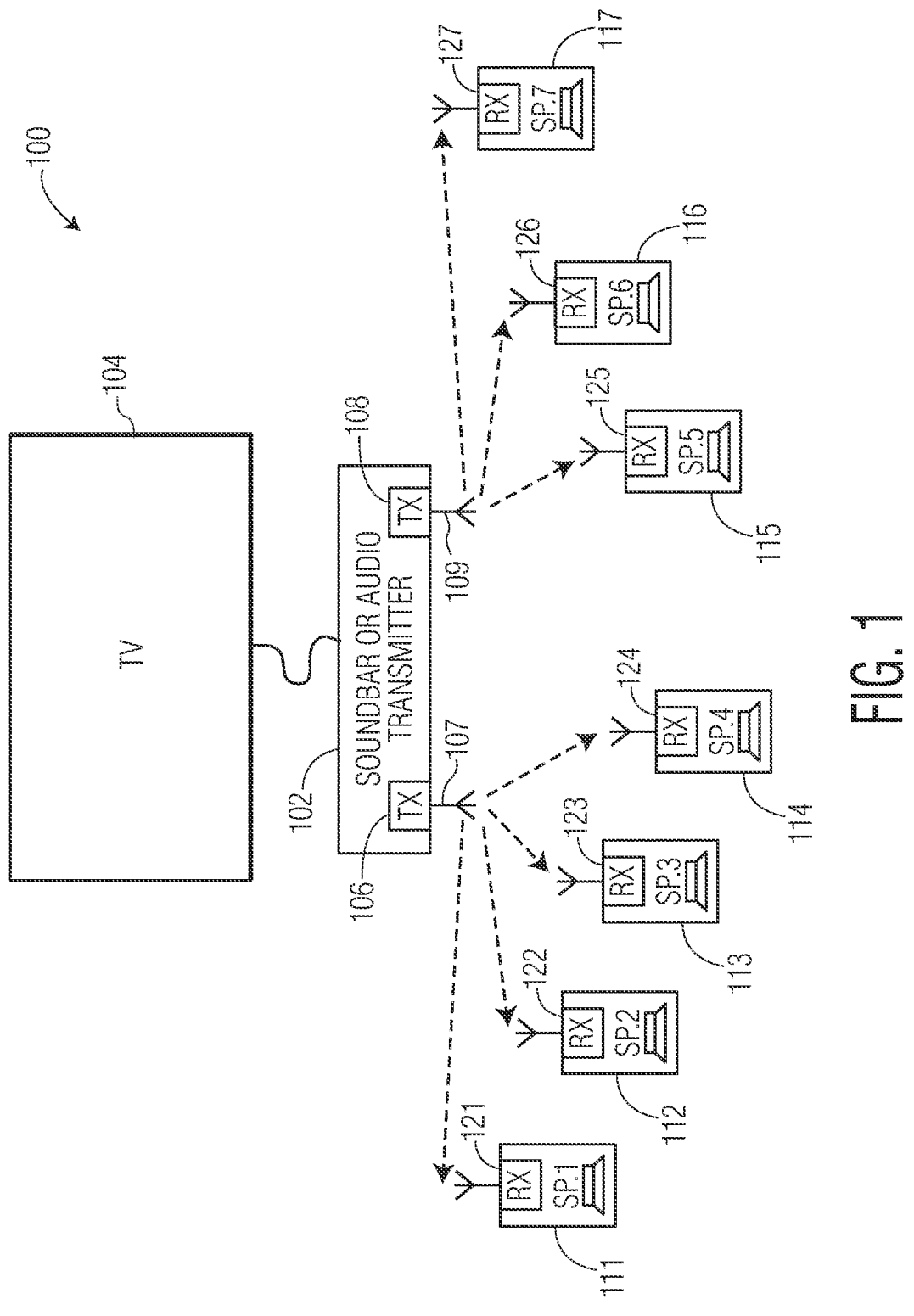
FIG. 1 is a block diagram of a home entertainment system.

FIG. 1 shows a multiple speaker audio system 100 in the context of a home theater system. This multiple speaker system is shown as an example and many modifications and variations may be made to suit different uses and purposes, including microphone capture, multiple rooms, etc. As shown, a soundbar 102 is coupled to a television 104. The soundbar may provide video to the television 104 or the television may provide audio to the soundbar 102. In the illustrated example, the television may be considered to receive a broadcast video signal from a terrestrial, cable, or satellite broadcast, display the video on the screen of the television and provide the audio to the soundbar. The soundbar may be incorporated into the television or the soundbar may represent an audio only device with no television.

The soundbar 102 generates audio streams and sends the streams through a first transmitter 106 of the soundbar coupled to a first antenna 107 or a second transmitter 108 coupled to a second antenna 109. The components are referred to as transmitters 106, 108 because that is the primary function described herein. In an expected implementation, the transmitters 106, 108 are transceivers with bidirectional capability. The soundbar uses the first transmitter 106 to implement a single LE Audio radio in the central role for transmitting the first four streams. A second transmitter 108 implements another single LE Audio radio in a second central role for transmitting the last three streams. A different audio stream is received at each of multiple audio sinks. In practice, each audio sink may be able to receive all of the audio streams but decodes only the one stream that is addressed to it through the audio streaming radio protocol. As shown, the first transmitter sends a different audio stream to each one of the first four audio sinks, namely speaker 1, 111, speaker 2, 112, speaker 3, 113, and speaker 4, 114. The second transmitter 108 sends a different audio stream to each of the next three audio sinks, namely speaker 5, 115, speaker 6, 116, and speaker 7, 117. Each speaker 111, 112, 113, 114, 115, 116, 117, includes a respective receiver 121, 122, 123, 124, 125, 126, 127 in each device as a single LE Audio device in a peripheral role to receive its respective stream. The components are referred to as receivers because that is the primary function described herein. In an expected implementation, the receivers are transceivers with bidirectional capability. In some embodiments a different one of seven different streams is provided for each speaker. Each speaker is able to receive a unique stream and produce a unique audio output. The soundbar 102 in this example has the role of the central. The central will setup and maintain an isochronous stream (or CIS) with each peripheral. In this example there will be seven CIS in total.

The soundbar 102 represents any of a variety of different audio sources and may be replaced with any of a variety of audio transmitters. In some embodiments, an audio/video receiver, set-top box, conferencing station or virtual reality controller is used instead of the soundbar. The soundbar may have integrated speakers to reproduce one or more audio channels, additional wired speakers, including those of the television 104 for some of the audio channels, or may have no speakers and rely on external speakers.

Any one or more audio sources (not shown) may be provided to the soundbar, e.g., an internet interface, Bluetooth radio interface, broadcast interface, disk player, turntable, media server, a television 104, etc. to receive audio in one or more channels. The soundbar or another component receives the audio data in any suitable format and generates the seven streams using suitable audio processing resources. The audio may contain seven discrete audio channels or the audio may be converted to seven different streams or to another number of streams, depending on the configuration of the audio system 100. The configuration, structure, and content of the original audio received by the soundbar may be adapted to different uses and configurations.

The speakers 111, 112, 113, 114, 115, 116, 117 represent any of a variety of different audio sinks and different types of devices with audio receivers may be substituted for the speakers. One or more of the speakers may be a part of a headset, headphone, earphone, or virtual reality headset. The audio sinks may be adapted to suit different uses. One or more of the audio sinks may be a full range speaker, an effects speaker, a subwoofer, placed in another room or location for a multi-room system. In a multiple broadcast system, each speaker may represent a different broadcast listener, e.g., an English language airport visitor, a Flemish language airport visitor, a Dutch language airport visitor, etc. and there may be multiple receivers of each type as has been demonstrated for an Auracast™ implementation.

In an alternative configuration each speaker includes a microphone that generates an audio stream to send back to the soundbar or each speaker may represent a microphone instead of a speaker. The particular nature of source and sink may be adapted to suit different sources and configurations. The speakers represent audio sinks of any of a variety of different configurations. The receivers 121, 122, 123, 124, 125, 126, 127 may be integrated into the same housing as an audio transducer that converts electrical signals into sound. Each speaker may include multiple discrete components or be fabricated as a single device. Each speaker may include additional functions and capabilities not discussed herein.

LE Audio allows for a separate isochronous (ISO) stream (CIS) to each peripheral device. Auracast allows for a separate broadcast isochronous stream (BIS) to each group or broadcast receivers. A scheduling algorithm at the leader, shown as the first transmitter 106 of the soundbar 102, creates a schedule for transmitting and receiving audio packets. The scheduler within the soundbar allocates a number of timeslots, referred to as subevents (SE), for exchange of one or more audio packets, including options for retransmissions. The schedule is repeated each ISO Event Interval so that the subevents act as slots in a repeating frame defined as the ISO Event Interval. Each stream is sent as different packets within assigned subevents of the ISO Event Interval. Accordingly, the bandwidth of the ISO Event Interval determines the amount of audio data that may be transmitted. This bandwidth may be allocated in different ways. With two streams or channels, higher definition audio may be transmitted. If all seven streams were sent from a single one of the transmitters 106, 108 of FIG. 1, then lower quality audio will be sent than might be possible for the illustrated two transmitter system.

The quality of a PCM (pulse code modulation) digital audio signal can be represented by a sample rate and a word length. Redbook compact disc is designated as 44.1 kHz/16-bit. For digital streaming sources 48 kHz/24-bit is popular. Higher and lower bit rates and word lengths are often used and other encoding systems are characterized differently. Either type of signal may be further encoded and compressed before transmission in the LE Audio protocol to reduce the required bandwidth to transmit each audio stream. For 44.1 kHz or 48 kHz streams around 100 kbps are sent for each audio stream, depending on the desired audio quality.

The airtime required to send 7 audio streams of 100 kbps each with a single subevent for each stream exceeds the bandwidth that is typically available for any one transmitter even without expected control overhead and retransmissions. The audio system 100 of FIG. 1 avoids this problem by using two transmitters 106, 108 so that only 3 or 4 streams are required from each transmitter. More transmitters may be used to support even more streams or higher bit rate audio streams. However this raises a new problem of collisions when both transmitters transmit on the same frequency at the same time.

LE Audio provides additional robustness to an audio stream by allowing for a retransmission in the event that an audio packet, e.g., a subevent, is not successfully received. Accordingly, when a packet in a subevent collides with a packet from the other transmitter, both transmitters may retransmit their respective packets. As described herein, the transmission of the audio streams may be configured to minimize collisions and thereby minimize retransmissions. This may allow for more channels or higher bitrates in some implementations.

FIG. 2 is a block diagram of a transmitter portion 200 of a soundbar, e.g., the soundbar 102 of FIG. 1 or a similar component. The transmitter portion 200 includes an audio source 202 that provides selected audio streams to a first LE Audio transmitter 204 with a first transmit antenna 208 and a second LE Audio transmitter 210 with a second transmit antenna 212.

A single audio bus 206, e.g., a Time Division Multiplex (TDM) audio bus is connected from the audio source 202 to both LE audio transmitters 204, 210 in the soundbar. The LE Audio protocol will ensure that all audio streams will have the same end-to-end audio latency over the two or more LE Audio networks. Each LE Audio network is the path from the audio source to a respective transmitter to each respective audio sink coupled to the transmitter. The two networks will create their own independent TDMA (Time Division Multiple Access) schedule, and frequency allocation table for audio streams from the respective transmitters 204, 210 to the associated audio sinks. As centrals, both transmitters 204, 210 are able to do channel assessments independently to optimize the LE Audio channel usage depending on interference from other devices. This leads to an acceptable airtime and low latency.

However, placing the two transmitters within their respective wireless ranges allows for strong interference if they transmit on the same frequency simultaneously. This can affect link robustness. This may occur during a subevent (SE) on the same or a very close frequency when both transmitters are transmitting or even when one transmitter is receiving and the other transmitter is receiving. These and other conflicts cause packet losses and reduced link robustness. If the two transmitters are not synchronized then the conflicts are not controlled and may be very small or very great in their effect on the other LE Audio network. The respective TDMA schemes, the actual transmit and receive timings, and the frequency allocation tables may overlap and cause collisions. Over time, the timings may also drift relative to each other. To address these and other concerns a synchronization bus 214 is provided between the two transmitters.

The synchronization bus 214 allows the two transmitters to align transmit and receive timings. In addition LE Audio TDMA schedules may be coordinated between one or more transmitters using the synchronization bus 214. Frequency channel maps and frequency usage may be coordinated between the two or more transmitters using the synchronization bus 214. The maps may use non-overlapping frequencies or hopping offsets for the same map. Channel indexes may also be offset between the isochronous stream (CIS) of two different channels using the synchronization bus 214.

The synchronization bus 214 may be a wired connection between the two or more radio devices, e.g., the LE Audio transmitters 204, 210, using a UART (Universal Asynchronous Receiver-Transmitter), SPI (Serial Peripheral Interface) or another chip-to-chip interface. The synchronization bus may include additional timing signals to achieve accurate synchronization between the two transmitters. In the described examples, one device, e.g., the first transmitter 204, acts as a leader, and the other device, e.g., the second transmitter 210, acts as a follower. The leader will give instructions, e.g., transmit commands, to the follower on which frequency bands to use and/or which TDMA timing to use. The follower device, there may be one or more follower devices, can contribute to the optimal selection by providing information to the leader device about the link quality that it measures on the available radio channels.

FIG. 3 is a process flow diagram of operations performed by the audio device, e.g. a soundbar, receiver, set-top box, VR (Virtual Reality) controller, broadcaster, as described herein. Block 302 is assessing available radio channels at a first audio transmitter, e.g., the first transmitter 204 of the audio device of FIG. 2. Block 304 is selecting a set of radio channels. This may be done using the assessing of the available radio channels of block 302 and also using channel assessments from the second audio transmitter 210. As discussed above, while these components are referred to herein as transmitters, they will typically be transceivers able to transmit or receive. For such assessments the transmitters 204, 210 are acting as receivers and measuring the RF energy at the available radio channels. The available radio channels may be in unlicensed band but subject to interference from other radio sources, including other radio transmitters, electrical interference, and environmental conditions that affect the propagation of signals in the available radio channels. Block 306 is transmitting a first set of audio streams received from an audio source, e.g., the audio source 202 to a first set of one or more audio sinks, e.g., speakers 111, 112, 113, 114 of FIG. 1, using the selected radio channels.

Block 308 is sending transmit commands to a second audio transmitter, e.g., second audio transmitter 210, through a synchronization bus, e.g., synchronization bus 214. As described in more detail below, the transmit commands may include frequency allocations, frequency maps hopping sequences, transmit parameter and other transmit commands. In addition, the synchronization bus may be used to synchronize the timing of the second audio transmitter to that of the first audio transmitter. Block 310 is transmitting a second set of audio streams from the audio source to a second set of one or more audio sinks, e.g., speakers 115, 116, 117, in accordance with the transmit commands.

Using the method of FIG. 3, interference between the first audio transmitter and the second audio transmitter may be avoided by assigning different transmit frequencies to each audio transmitter using transmit commands through the synchronization bus. The leader, e.g., the first audio transmitter, can do channel assessment, select a set of frequency bands which can be optimally used and divide the selected bands into two non-overlapping channel maps. The leader will use the first channel map and will instruct the follower, e.g., the second audio transmitter, to use the second channel map.

Additionally, the follower can also do channel assessment and provide the information to the leader. The channel assessment may be used alone or in combination with the channel assessment by the leader. In this example, the leader can create the two non-overlapping channel maps based on information from both devices. This prevents any collision caused by the two audio transmitters transmitting on the same frequency at the same time, eliminating packet loss cause by the other audio transmitter.

This technique may cause twice as many frequency bands to be occupied. For a system with multiple followers, even more frequency bands are used. Stated another way, for a fixed number of suitable radio channels, half as many radio channels is available for each audio transmitter. LE Audio like other Bluetooth communication protocols uses frequency hopping to reduce collisions with external interferers. In LE audio, the audio streams are each assigned a CIS index and are placed in a time sequence as individual subevents. The audio streams hop frequencies at each subevent in accordance with a hopping sequence. The sequence number of the hopping sequence changes after each subevent, but the pseudorandom sequence may repeat a frequency at some number of times before changing the frequency. Accordingly, the frequency may not change after every subevent. One effect of this approach is that if a packet of a stream is sent on a frequency that was obscured by an interferer, then the next opportunity to resend the packet will be at a different frequency. This may avoid interference on the first frequency. Dividing the radio channels into two discrete groups, reduces the number of radio channels available to a particular transmitter. This can cause the total solution, of both transmitters splitting the available radio channels, to be more susceptible to interference from other sources since the total number of available frequency bands per LE Audio network reduced by half.

To ensure that both audio transmitters are able to use the full complement of available radio channels, the transmissions may be coordinated through the synchronization bus in a few different ways. In general, with LE Audio the frequency hopping algorithm determines that a frequency hop occurs at each subevent. Both audio transmitters will hop at the same time and in the same way, when physical link parameters are selected that result in the same input seed into the hopping algorithms and when the link start time is synchronized. The coordinated, synchronized transmission may be used so that both audio transmitters can simultaneously transmit without frequency overlap.

In this example, the leader audio transmitter selects a first set of radio channels for transmitting the first set of audio streams, and selects a second set of radio channels for transmitting the second set of audio streams. The transmit commands include an identification of the second set of radio channels for use by the follower audio transmitter. The first or leader audio transmitter transmits the first set of audio streams using the first set of radio channels and the follower audio transmitter transmits the second set of audio streams on the second set of radio channels. In this example, the first set of radio channels does not include any radio channels of the second set of radio channels and the second set of radio channels does not include any radio channels of the first set of radio channels.

Figure 4:
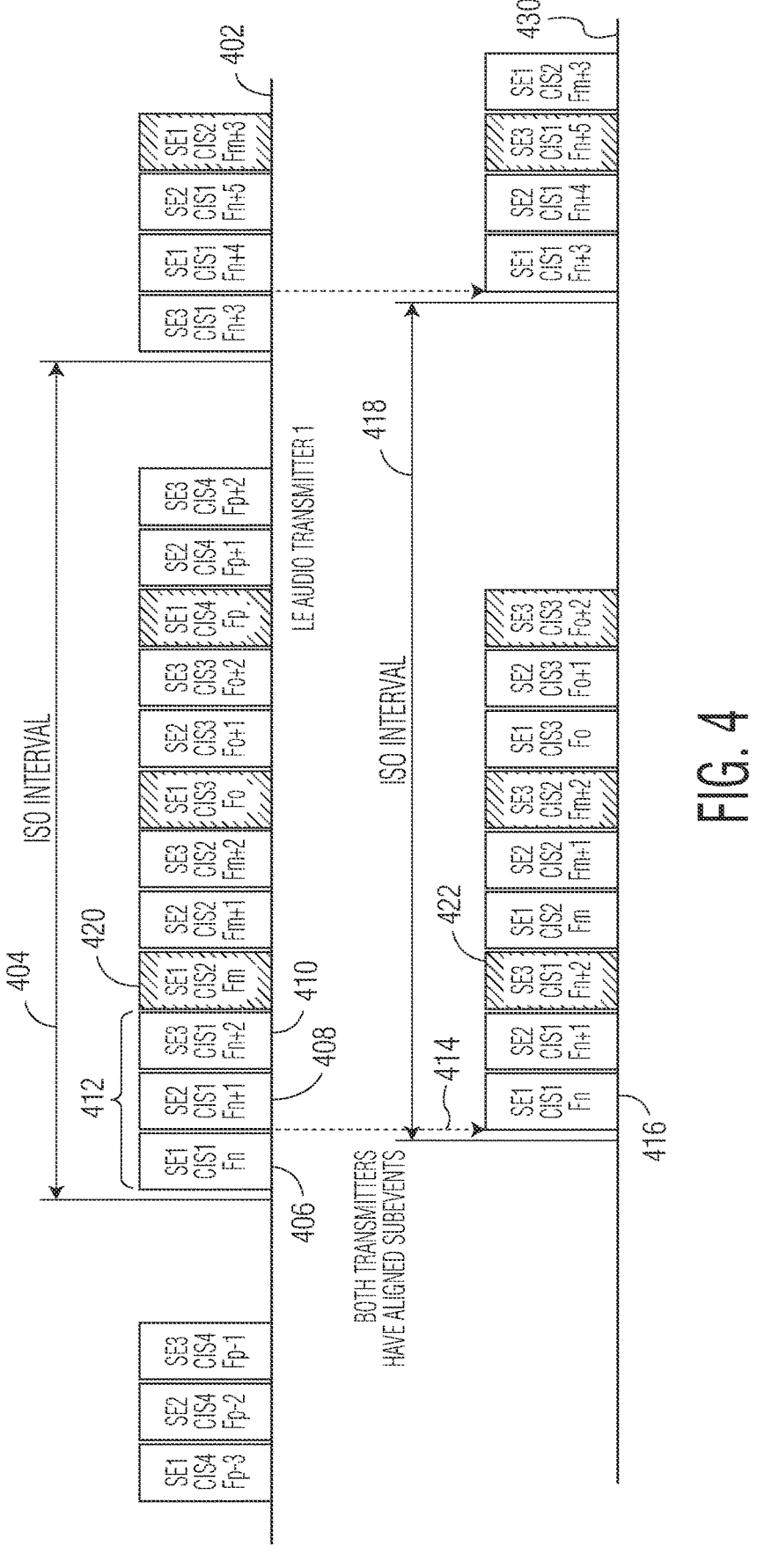
FIG. 4 is a signal diagram of a first audio stream along a first timeline and a second audio stream along a second timeline according to embodiments herein.

FIG. 4 is a signal diagram of a first audio stream along a first timeline 402, as may be transmitted by the first audio transmitter and a second audio stream along a second timeline 430 as may be transmitted by the second audio transmitter. The audio streams have a similar structure but the packets carry different data. The first timeline 402 is for the leader audio transmitter. The packets are contained within a repeating ISO Event Interval 404. The ISO Event Interval 404 has a first subevent 406, a second subevent 408, and a third subevent 410, each corresponding to a different audio stream. The three subevents 406, 408, 410 make up a first CIS 412 of subevents that repeats with the next CIS for the same three audio streams. While three are shown any other number may be used. As indicated the first subevent 406 is labeled as SE1, CIS1, and Frequency $F_n$. The second subevent 408 is labeled as SE2, CIS1, $F_{n+1}$. The third subevent 410 is labeled as SE3, CIS1, $F_{n+2}$. The next CIS starts again with a new first subevent 420 SE1 for CIS2 and another frequency $F_m$. As shown the third subevent 422 of the second audio stream on the second timeline 430 is offset by one subevent from the third subevent 420 of the first audio stream on the first timeline 402. This offset continues through the second timeline and collisions are avoided.

In one example, the follower audio transmitter uses an equal length for each subevent 416 and aligns each subevent with a subevent of the leader audio transmitter as shown by the synchronization line 414. However, the first subevent 416 of the synchronized ISO Event Interval 418 has an offset of one subevent. This allows both audio transmitters to use the full range of available radio channels and reduces the number of possible conflicts by a factor of 3. Only the overlapping subevents between different corresponding CIS streams can still have different frequencies and cause packet loss. The offset by one subevent provides a significant reduction in collisions compared to other techniques. The second audio transmitter synchronizes transmitting the second set of audio streams with the first audio transmitter using the synchronization bus and offsetting the transmitting of the second set of audio streams by an integer number of subevents with respect to the subevents of the first audio transmitter.

In order to implement such an offset, the process of FIG. 3 may be used and the offset may be sent as part of the transmit commands. The specific offset may be configured to suit different channel conditions and system configurations. The offset may be one or another number of subevents. The synchronization bus may also be used to send a channel map to the follower audio transmitter.

In a further alternative, the frequency map is the same between the first and the second audio transmitter and the offset is one or more hops of the frequency hopping sequence. By aligning the first SE 516 of the follower not with the second SE 408 of the leader as in FIG. 4 but with the first SE 506 of the leader as in FIG. 5, there is a complete frequency overlap at every SE. This is avoided by extending the LE Audio channel hopping sequence for the follower audio transmitter by one frequency hop offset compared to the start frequency from at CIS creation. This ensures zero overlap because each follower frequency band selection will have a configurable offset in the follower channel map index versus the leader frequency.

FIG. 5 is a signal diagram of a first audio stream along a first timeline 502, as may be transmitted by the first audio transmitter and a second audio stream along a second timeline 530 as may be transmitted by the second audio transmitter. The audio streams have a similar structure but each packet carries different data. The first timeline 502 is for the leader audio transmitter. The packets are contained within a repeating ISO Event Interval 504. The ISO Event Interval 504 has a first subevent 506 and subsequent subevents as in the example of FIG. 4. As indicated the first subevent 506 is labeled as SE1, CIS1, and Frequency $F_n$. The first subevent 516 of the second timeline 530 is labeled as SE1, CIS1, and frequency $F_{n+1}$. This frequency indicates a one hop offset from the frequency of the first subevent 506 of the first timeline 502.

The follower subevents are aligned based on the synchronization line 514 with the corresponding leader subevent. The subevents may also be from the same CIS, as shown. Since there is always a difference due to the offset of one or more subevents in the channel index, e.g., $F_n$, $F_{n+1}$, a frequency mismatch between two audio streams is maintained. This avoids packet loss between the central devices. This offset may be implemented with only a small modification to the existing LE Audio protocol.

In another example, the offset may be expressed in terms of a frequency offset. While in FIG. 4, the offset was by one or more SEs and in FIG. 5, the offset was by one or more frequency hops, in FIG. 6, the offset is presented as a frequency offset e.g. a specific number of kHz. Alternatively, a numerical offset may be added to the channel index modulo the number of channels. The specific value for the frequency offset may be selected based on the available radio channels and the nature of the transmitters and receivers in the radio environment suitable to ensure that there is no significant interference. In this example, the same base hopping frequency sequence may be used, but the leader or follower frequencies may be altered by adding an offset, e.g., to the channel index. The channel index is the position of a radio frequency (RF) frequency in the active channel. If multiple LE Audio central followers are connected to a single LE audio leader, each follower can have a different offset.

The frequency used for each LE audio follower can be calculated using any suitable formula. In one example, the formula may be expressed as:

$$Ci\_follower=(Ci\_leader+F\text{offset\_follower})\bmod \text{channel\_map\_length}$$

where Ci_follower is the channel index of a follower subevent, Ci_leader is the channel index of the leader, Foffset_follower is the frequency offset applied to subevents of the follower, and channel map length is the number of hops in the channel hopping sequence before the channel hopping sequence repeats.

FIG. 6 is a signal diagram of a first audio stream along a first timeline 602, as may be transmitted by the first audio transmitter and a second audio stream along a second timeline 630 as may be transmitted by the second audio transmitter. The audio streams have a similar structure but the packets carry different data. The first timeline 602 is for the leader audio transmitter. The packets are contained within a repeating ISO Event Interval 604. The ISO Event Interval 604 has a first subevent 606 and subsequent subevents as in the example of FIG. 4.

As indicated the first subevent 606 is labeled as SE1, CIS1, and Frequency Fn. The first subevent 616 of the second timeline 630 is synchronized as shown by a synchronization line 614 with the first subevent 606 of the first audio transmitter as in FIG. 5. The first subevent 616 of the second timeline 630 is labeled as SE1, CIS1, and frequency $F_{n+Foffset}$. This frequency indicates that is the frequency $F_n$ of the leader's first subevent with an added frequency offset $F_{offset}$. The frequency offset may be positive or negative. The frequency offset may be sent over the synchronization bus as in the other examples. The SEs are sent at a different frequency between the two transmitters due to the offset. As in the other examples, there may be more than one follower audio transmitter. One is shown in order to simplify the description.

FIG. 7 is a block diagram of an audio transmitter suitable for use as a leader or follower in the context of the examples described above. The form factor may be modified to suit different purposes and be integrated with a variety of different audio devices, e.g., a soundbar, receiver, VR controller, etc. The audio transmitter has an audio interface 706 coupled to an audio bus 707 to receive audio from a suitable audio source. The audio interface is coupled to an audio codec 704 to convert the received audio into a format suitable for transmitting to audio sinks through an RF system 712. A bus interface 714 is coupled to a synchronization bus 715 to communicate with other audio transmitters as a leader or follower.

The audio interface 706 and bus interface are further coupled to a processor 708 to provide data which the processor may use and communicate in any suitable way. The processor is coupled to a memory 710 to store data from the interfaces and other values determined by the processor or received from other components.

The processor and memory are also coupled to the RF system 712 that provides communication to the audio sinks and other external components that may include network nodes, a user interface, and other audio transmitters. The RF system includes one or more antennas 713 to send and receive radio signals. The RF system also receives signal on available radio channels to allow the RF system 712 of the system 700 to assess available radio channels. In one use example, the system 700 communicates with a smart phone (not shown) through an RF interface to provide information to the user to allow audio configuration. In another use example, the system communicates with a cellular or Wi-Fi network node to send information directly to a control device or user interface. The RF interface may use one or more wireless communications system and protocols in addition to the Bluetooth LE Audio and Auracast referred to herein including near field communication, Wi-Fi and cellular.

The system 700 may be in the form of a single integrated circuit (IC) or some of the components may be combined while other components are not. The multiple components may be combined into a single package for example as a multi-chip module (MCM) or system in a package (SiP) or other physical implementation. Additional components may be added to the system 700 and fewer components may be used. Some functions may be provided on different modules than as described herein. More or fewer modules may be provided than as shown herein.

Boundaries between the above-described operations are provided as examples. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Alternatively, embodiments of the invention may be implemented entirely in hardware or in an implementation containing both hardware and software elements. In embodiments which use software, the software may include but is not limited to firmware, resident software, microcode, etc.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. The term "coupled" or similar language may include a direct physical connection or a connection through other intermediate components even when those intermediate components change the form of coupling from source to destination.

The described examples may be implemented on a single integrated circuit, for example in software in a digital signal processor (DSP) as part of a radio frequency integrated circuit (RFIC). The described examples may also be implemented in hardware in a field programmable gate array (FPGA) or application specific integrated circuit (ASIC), or in other electronic devices. The described examples may be implemented in analog circuitry, digital circuitry, or a combination of analog and digital circuitry. Alternatively, the circuit and/or component examples may be implemented as any number of separate integrated circuits or separate devices interconnected with each other in a suitable manner. These examples may alternatively be implemented as software or code representations of physical circuitry or of logical representations convertible into physical circuitry, such as in a hardware description language or any other appropriate form.

It will be readily understood that the components of the embodiments as generally described herein and illustrated in the appended figures may be arranged and designed in a wide variety of different configurations. Thus, the more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention may be practiced without one or more of the specific features or advantages of a particular embodiment. In other instances, additional features and advantages may be recognized in certain embodiments that may not be present in all embodiments of the invention.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An audio device comprising:
an audio source;
a synchronization bus;
a first audio transmitter coupled to the audio source and to the synchronization bus, the first audio transmitter configured to assess available radio channels, to select a set of radio channels, to send transmit commands to a second audio transmitter through the synchronization bus, and to transmit a first set of audio streams from the audio source to a first set of one or more audio sinks using the selected radio channels; and
the second audio transmitter coupled to the audio source and to the synchronization bus configured to receive the transmit commands from the first audio transmitter through the synchronization bus and to transmit a second set of audio streams from the audio source to a second set of one or more audio sinks in accordance with the transmit commands, wherein the second audio transmitter is configured to synchronize transmitting the second set of audio streams with the first audio transmitter using the synchronization bus.

2. The audio device of claim 1, wherein the second audio transmitter is configured to assess available radio channels, to generate link quality information based on the assessing, and to send the link quality information to the first audio transmitter through the synchronization bus, wherein the first audio transmitter is configured to select a set of radio channels based, at least in part, on the link quality information.

3. The audio device of claim 1, wherein the first audio transmitter is configured to select a set of radio channels by selecting a first set of radio channels for transmitting the first set of audio streams, and selecting a second set of radio channels for transmitting the second set of audio streams, and wherein the transmit commands include an identification of the second set of radio channels.

4. The audio device of claim 3, wherein the first set of radio channels does not include any radio channels of the second set of radio channels and the second set of radio channels does not include any radio channels of the first set of radio channels.

5. The audio device of claim 3, wherein the first set of radio channels are represented as a first channel map and the second set of radio channels are represented as a second channel map, and wherein the first audio transmitter is configured to send the second channel map in the transmit commands.

6. The audio device of claim 1:
wherein the audio streams comprise repeating sequences of subevents,
wherein the audio streams hop frequencies at subevents in accordance with a hopping sequence, and
wherein the second audio transmitter is configured to transmit the second set of audio streams synchronized with the first audio transmitter with the subevents offset by an integer number of subevents with respect to the subevents of the first audio transmitter.

7. The audio device of claim 6, wherein the second audio transmitter is configured to transmit the second set of audio streams with an offset of one subevent of the sequence of subevents.

8. The audio device of claim 6, wherein the first audio transmitter is configured to send a channel map of the selected set of radio channels to the second audio transmitter through the synchronization bus and wherein the first audio transmitter is configured to transmit the first set of audio streams based on the channel map and the second audio transmitter transmits the second set of audio streams based on the channel map.

9. The audio device of claim 1:
wherein the audio streams comprise repeating sequences of subevents,
wherein the audio streams hop frequencies at subevents in accordance with a hopping sequence, and
wherein the second audio transmitter is configured to transmit the second set of audio streams synchronized with the first audio transmitter with the hopping sequence and an offset to the hopping sequence.

10. The audio device of claim 9, wherein the offset comprises a channel index offset.

11. The audio device of claim 9, wherein the offset comprises a frequency offset.

12. The audio device of claim 6, wherein the secondary audio transmitter is configured to receive input parameters for the hopping sequence from the first audio transmitter through the synchronization bus, and wherein the second audio transmitter is configured to generate the hopping sequence for transmitting the second set of audio streams seeded by the input parameters.

13. A method comprising:
assessing available radio channels at a first audio transmitter;
selecting a set of radio channels;

transmitting a first set of audio streams received from an audio source from a first transmitter to a first set of one or more audio sinks using the selected radio channels;

sending transmit commands to a second audio transmitter through a synchronization bus; and transmitting a second set of audio streams received from the audio source from the second audio transmitter to a second set of one or more audio sinks in accordance with the transmit commands, wherein the transmitting the second set of audio streams is synchronized with the transmitting the first set of audio streams using the synchronization bus.

14. The method of claim 13, further comprising:

assessing available radio channels at the second audio transmitter;

generating link quality information based on the assessing; and sending the link quality information to the first audio transmitter through the synchronization bus, wherein selecting a set of radio channels comprises selecting a set of radio channels based, at least in part, on the link quality information.

15. The method of claim 13:

wherein the audio streams comprise repeating sequences of subevents, wherein the audio streams hop frequencies at subevents in accordance with a hopping sequence, the method further comprising:

the second audio transmitter offsetting the transmitting the second set of audio streams by an integer number of subevents with respect to the subevents of the first audio transmitter.

16. The method of claim 15, wherein the offset is one subevent of the sequence of subevents.

17. The method of claim 15, further comprising:

sending a channel map of the selected set of radio channels to the second audio transmitter through the synchronization bus, wherein transmitting the first set of audio streams comprises transmitting the first set of audio streams based on the channel map, and wherein transmitting the second set of audio streams comprises transmitting the second set of audio streams based on the channel map.

18. The method of claim 13:

wherein the audio streams comprise repeating sequences of subevents, wherein the audio streams hop frequencies at subevents in accordance with a hopping sequence, and wherein transmitting the second set of audio streams comprises transmitting the second set of audio streams synchronized with the first audio transmitter with the hopping sequence and an offset of one hop to the hopping sequence.

19. The method of claim 18, wherein the offset comprises a channel index offset.

20. An apparatus comprising:

means for assessing available radio channels at a first audio transmitter;

means for selecting a set of radio channels;

means for transmitting a first set of audio streams received from an audio source to a first set of one or more audio sinks using the selected radio channels;

means for transmitting a second set of audio streams from the audio source to a second set of one or more audio sinks synchronized with the means for transmitting the first set of audio streams in accordance with received transmit commands; and means for sending the received transmit commands to the means for transmitting the second set of audio streams from the means for transmitting the first set of audio streams.

* * * * *